(12) United States Patent
Parkinson et al.

(10) Patent No.: US 6,527,297 B1
(45) Date of Patent: Mar. 4, 2003

(54) INFLATOR DEVICE IGNITION OF GAS GENERANT

(75) Inventors: David W. Parkinson, North Ogden, UT (US); Steven B. Kenney, Pleasant View, UT (US); Gregg Hess, Hyrum, UT (US); Steve Hammer, North Ogden, UT (US); Ivan V. Mendenhall, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 171 days.

(21) Appl. No.: 09/650,786

(22) Filed: Aug. 30, 2000

(51) Int. Cl.[7] .................. B60R 21/28; C06B 31/02; C06D 5/00
(52) U.S. Cl. .................. 280/741; 149/61; 102/530
(58) Field of Search .................. 149/61, 37; 280/741; 102/530, 531

(56) References Cited

U.S. PATENT DOCUMENTS

| | | | |
|---|---|---|---|
| 4,116,466 A | | 9/1978 | Gehrig |
| 4,561,675 A | | 12/1985 | Adams et al. .............. 280/734 |
| 4,698,107 A | * | 10/1987 | Goetz et al. .................... 149/7 |
| 4,806,180 A | * | 2/1989 | Goetz et al. .................... 149/5 |
| 5,034,070 A | * | 7/1991 | Goetz et al. .................... 149/3 |
| 5,106,772 A | | 4/1992 | Lai |
| 5,273,313 A | | 12/1993 | Klobber et al. |
| 5,299,828 A | | 4/1994 | Nakajima et al. |
| 5,322,018 A | * | 6/1994 | Hadden et al. .............. 102/284 |
| 5,610,444 A | | 3/1997 | Austruy et al. .............. 264/3.3 |
| 5,668,345 A | | 9/1997 | Schroeder et al. |
| 5,695,216 A | * | 12/1997 | Sandstrom et al. ......... 280/737 |
| 5,704,640 A | | 1/1998 | Monk et al. |
| 5,750,922 A | | 5/1998 | Seeger |
| 5,756,929 A | * | 5/1998 | Lundstrom et al. ........... 149/22 |
| 5,834,679 A | | 11/1998 | Seeger |
| 6,077,372 A | | 6/2000 | Mendenhall et al. |
| 6,086,693 A | | 7/2000 | Mendenhall et al. |

FOREIGN PATENT DOCUMENTS

| | | | |
|---|---|---|---|
| EP | 0 710 637 A1 | 5/1996 | |
| EP | 0 584 921 B1 | 10/1996 | |
| EP | 0 870 746 | 10/1998 | ............ C60D/5/06 |
| WO | 93/11089 | 6/1993 | ............ C06B/45/00 |
| WO | 98/18742 | 5/1998 | ............ C06B/29/02 |
| WO | 00/46170 | 8/2000 | |

* cited by examiner

*Primary Examiner*—Michael J. Carone
*Assistant Examiner*—Aileen J. Baker
(74) *Attorney, Agent, or Firm*—Sally J. Brown; James D. Erickson

(57) ABSTRACT

Inflator device assemblies wherein an igniter composition used to ignite an associated gas generant material is provided on a selected surface, such as on a damper pad, within the inflator device. Suitable igniter compositions may include a silicone resin additive effective to adhere the igniter composition to a surface within the inflator device.

35 Claims, 8 Drawing Sheets

INFLATOR DEVICE IGNITION OF GAS GENERANT

BACKGROUND OF THE INVENTION

This invention relates generally to the ignition of combustible materials and, more particularly, to ignition of gas generant materials such as used in inflator devices used for the inflation of inflatable restraint airbag cushions.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Many types of inflator devices have been disclosed in the art for use in the inflating of one or more inflatable restraint system airbag cushions. Many prior art inflator devices include solid form gas generant materials which are burned to produce or form gas used in the inflation of an associated airbag cushion.

Such inflator devices tend to involve rather complex ignition processes. For example, it is relatively common to employ an electrically initiated squib to ignite a separate charge of an igniter composition. The products of such ignition are then used to ignite the gas generant material. In practice, the ignition process of many various prior inflator devices require such a separate igniter charge because the squib does not itself generally supply sufficient hot gas, condensed phase particles or other ignition products to heat the gas generant material to result in the reaction of the material such as to result in desired gas generation.

FIG. 1 illustrates an inflator device or assembly generally designated by the reference numeral 10 and such as is known in the prior art. The inflator assembly 10 has a generally cylindrical external outline and includes a housing construction 12 such as formed of two structural components, i.e., a lower shell or base portion 14 and an upper shell or diffuser cap portion 16, such as may desirably be made of steel and appropriately joined or fastened together such as by application of an inertia welding operation. The housing 12 is illustrated in the general form of a flattened, disk-shaped circular cylinder typically or generally having a length to diameter ratio of about 0.5 or less. It will be appreciated that such a sized and shaped housing may most conveniently correspond to the shape of the vehicle steering wheel and can therefore facilitate assembly in an aesthetically pleasing manner.

The diffuser cap portion 16 is in the general form of an inverted bowl and includes a top wall 18 and a cylindrical sidewall 20. The sidewall 20 includes a plurality of spaced, preferably, generally uniformly spaced gas exit ports 22.

The base portion 14 includes a mounting opening 24, the use of which will be discussed in greater detail below. The base portion 14 also includes a peripheral bracket 28 that extends radially outward from the housing 12 and serves to form an interface attachment which is used to attach the inflator assembly 10 to a vehicle, the occupants of which are to be protected from injury such as may result from the impact of a collision.

The housing 12 is configured to define a generally cylindrical chamber 30. The chamber 30 contains or houses a supply of a gas generant material 32, such as composed of a pyrotechnic, such as known in the art, in a desired selected form. In FIG. 1, the gas generant 32 is shown as contained in the chamber 30 in a tablet form but other forms, such as known in the art may be used. Surrounding the gas generant material 32 is a filter assembly 34 such as includes a cooling screen or filter such as formed of multiple layers or wraps of metal screen.

The inflator assembly 10 also includes a retainer assembly 36 such as composed of a retainer 38 and annular-shaped diffuser and base damper pads, 40 and 42, respectively, and such as serving as construction expedients. For example, the inclusion of such a retainer assembly or specific components thereof may be useful and desired to retain the inflator assembly components in proper relative arrangement, prevent undesired gas flow passage through the assembly and/or minimize or avoid undesired contact of the gas generant within the assembly 10 such as may create undesired rattle or noise should the assembly be subjected to certain vibrations or other movements or forces. In practice, such damper pad elements are commonly composed or fabricated of a glass fiber material or the like.

Surrounding the filter 34 and generally adjacent the inner surface of the sidewall 20 is an adhesive-backed foil seal 44 which preferably hermetically seals the gas generant material 32 within the inflator 10, thereby protecting the gas generant material from possibly damaging ambient conditions, such as including moisture.

An igniter assembly, generally designated by the reference numeral 48, is mounted to the housing 12 in a location within the chamber 30 via the mounting opening 24. The igniter assembly 48 may take the form of a known pyrotechnic initiator device such as includes, as are known in the art, an igniter cup 50 having an interior 51 wherein is housed an igniter material 52, an igniter device or squib 54, and a squib adapter or holder 56 whereby the igniter assembly 48 is mounted to or mated with the housing 12. As shown, the igniter cup 50 and associated components of the igniter assembly 48 are inserted or fitted into or through an igniter tube 58. The igniter tube 58 can be formed of a gas-impermeable material, e.g., a metal such as plain carbon steel, and includes a plurality of spaced apart exit orifices 60 wherethrough products of ignition can be passed through and directed into contact with the gas generant material 32 to effect ignition and reaction thereof.

When actuated, the squib 54 causes ignition of the igniter material 52 which customarily results in an increase in pressure within the cup interior 51 with the subsequent predetermined rupturing or opening of the igniter cup 50 to permit passage, through the exit orifices 60, of ignition products produced by the combustion of the igniter material 52. With such passage, the ignition products are put into contact with the gas generant material 32 contained within the inflator chamber 30 such as to result in the ignition and reaction of the gas generant material 32. The gas generant material thus reacts to produce gas. The gas so produced passes through the filter 34, rupturing the foil seal 44 and passing through the gas exit ports 22 and out from the inflator assembly 10 into an associated airbag cushion (not shown). As will be appreciated, the contact of ignition products with the gas generant material can appropriately be, either or both, thermal or physical in nature.

In practice, the igniter assembly 48 can be formed by placing the igniter cup 50 containing the igniter material 52 over the igniter device/squib 54 and the holder 56. The igniter assembly 48 can be desirably placed at the mounting opening 24, such as with the igniter tube 58 in press fit relationship therewith, and joined to the housing 12 such as by welding the holder 56 to the base portion 14 at the mounting opening 24.

Such igniter charges have also been used in various dual stage or adaptive inflator assemblies. For example, FIG. 2 illustrates a dual stage or adaptive output inflator device or assembly generally designated by the reference numeral 210, such as generally disclosed in commonly assigned, co-pending U.S. patent application Ser. No. 09/465,082, the disclosure of which is hereby incorporated by reference. The inflator assembly 210 has various features in common with the inflator assembly 10, described above. In particular, the inflator assembly 210 has a generally cylindrical external outline and includes a housing construction 212 such as formed of a lower shell or base portion 214 and an upper shell or diffuser cap portion 216 and in the general form of a flattened, disk-shaped circular cylinder.

The diffuser cap portion 216 includes a top wall 218 and a cylindrical sidewall 220. The sidewall 220 includes a plurality of spaced gas exit ports 222. The base portion 214, in addition to a first mounting opening 224, however, also includes a second mounting opening 226. The base portion 214 includes a radially outward extending peripheral mounting or attachment bracket 228.

The housing 212 is configured to define a generally cylindrical first chamber 230 which contains or houses a supply of a first gas generant material 232, such as composed of a pyrotechnic. While the gas generant material 232 is shown in an extruded cylindrical perforated solid form, e.g., in the form of solids which include a cylindrical bore such that the gas generant material is generally tubular in shape, gas generant in other suitable forms can be used. Surrounding the gas generant material 232 is a filter assembly 234 such as includes a cooling screen or filter such as formed of multiple layers or wraps of metal screen.

The inflator assembly 210 also includes a retainer assembly 236 such as composed of a retainer 238, a diffuser damper pad 240 and a base damper pad 242. A foil seal 244, generally adjacent the inner surface of the sidewall 220, seals the gas generant material 232 within the inflator 210.

A first igniter assembly, generally designated by the reference numeral 248 and similar to the igniter assembly 48 described above, is mounted to the housing 212 in a location within the first chamber 230 via the mounting opening 224. The first igniter assembly 248 includes an igniter cup 250 having an interior 251 wherein is housed a supply of igniter material 252, an igniter device or squib 254, and a squib adapter or holder 256 whereby the igniter assembly 248 is mounted to or mated with the housing 212. The igniter cup 250 and associated components of the igniter assembly 248 are inserted or fitted into or through an igniter tube 258. The igniter tube 258, similar to the igniter tube 58 includes exit orifices (not shown) wherethrough products of ignition can be passed through and directed into contact with the gas generant material 232 to effect ignition and reaction thereof.

The first chamber 230 also houses or contains a second chamber 262. It is with respect to this second chamber and the construction and operation thereof that the inflator assembly 210 differs most significantly from the inflator assembly 10 described above. The second chamber 262 includes a generant cup 264, a lid closure 265, a second igniter device or squib 266, and a second squib adapter 268 whereby the second chamber 262 is mounted to or mates with the housing 212 at the second mounting opening 226.

The generant cup 264 and the lid closure 265 cooperate to form a generant cup interior 270 wherein desirably placed is a selected quantity of a second gas generant material 272. The second gas generant material 272 may typically be in the form of a pyrotechnic material and may be either the same or different in composition, shape, size or form, as compared to the first gas generant material 232.

The generant cup 264 desirably includes a generally cylindrical sidewall 274 and such as preferably includes a shoulder portion 276 such as formed therein. The lid closure 265 and the shoulder portion 276 may desirably form a press or interference fit form of attachment when in a static state or condition. The generant cup 264 and the lid closure 265 cooperate and function in a manner such as to prevent the combustion products resulting upon actuation of the first igniter device 254, to enter into the second chamber 262. Further, the generant cup 264 and the lid closure 265 desirably cooperate and function in a manner such as to permit the combustion products formed by reaction of the gas generant material contained within the second chamber 262, when properly and desirably actuated, to pass from the second chamber 262 out into the first chamber 230 and subsequently through the filter assembly 234 and out through the exit ports 222 into an associated airbag cushion (not shown).

For example, in a typical deployment operation involving actuation and firing of the second chamber 262, actuation of the second igniter squib 266 results in sufficient discharge to ignite at least some of the second gas generant material 272. The ignition and reaction of the second gas generant material in turn produces or results in sufficient pressure within the second chamber 262 to dislodge the lid closure 265 from the shoulder portion 276 such as to open the second chamber 262 to entry of combustion products formed by or as a result of actuation of the first chamber 230. Entry into the second chamber of such combustion products desirably can result in the more complete or full combustion of the remaining second gas generant material.

A common means of obtaining substantially simultaneously ignition of an extended length of an igniter composition charge is by means of an ignition cord. In practice, however, it is common that such a length of ignitor cord be housed or contained within an igniter tube extending within such an igniter charge.

While ignition of a gas generant material may ultimately be achieved through such the inclusion and use of an igniter charge, such assemblies and associated uses tend to undesirably complicate the ignition process as well as to complicate the manufacture, production and design of the associated inflator device. For example, such uses typically necessitate the manufacture of a container or other storage device to hold or store the igniter composition and then the incorporation of such a storage container in the inflator device. As will be appreciated, the incorporation and use of such an ignition process can detrimentally impact either or both the weight and cost of the corresponding apparatus hardware. Further, space is often at a premium in modem vehicle design. Consequently, it is generally desired that the space requirements for various vehicular components, including inflatable vehicle occupant restraint systems, be reduced or minimized to as great an extent as possible. The incorporation of an igniter assembly such as described above and associated support structures, may require a larger than desired volume of space within an associated inflator device. In particular, such volume of space could potentially be utilized to store or contain gas generant material and thereby permit the volume of space required by the inflator device to be reduced.

Thus, there is a need and a demand for alternative airbag inflator device ignition schemes and, in particular, there is a need and a demand for avoiding the requirement or inclusion of separate igniter composition charges and associated ignition trains or hardware. One approach discussed in the prior art has been to apply a coating of an igniter formulation directly on a gas generant material. For example, various patents, including U.S. Pat. Nos. 4,698,107; 4,806,180; and 5,034,070, disclose processing wherein an ignition coating is applied, such as in the form of a liquid or a water slurry, to azide-based gas generant materials. Such processing typically necessitates first the formation of the azide-based gas generant, including the proper forming and drying of gas generant grains in selected shapes, followed by the coating of the grain with a wet slurry of the ignition material, such as by immersion of the grain in a slurry of the coating material, and then final drying.

In such dip coat processing, generally either individual gas generant tablets or wafers are coated as they go through a coating slurry on a conveyer belt, or the gas generant tablets or wafers are put in bulk containers and submerged in the slurried coating material. These types of process are typically relatively slow and may lead to problems such as coated tablets/wafers sticking either or both to themselves and associated equipment, such as conveyer belts.

In addition, dependent on the shape of the gas generant tablet or wafer there may also be a problem in obtaining application of a uniform coating. For example, if the gas generant material has a relatively flat form, the slurry coating may tend to pool and may therefore dry to form a coating of variable thicknesses.

Also, dip coating equipment (e.g., dip baskets and conveyer belts) may easily be contaminated with igniter material, leading to potential or increased safety concerns.

In view of the above, there is a need and a demand for materials and processing techniques such as may facilitate or permit the inclusion of an igniter composition within an inflator device, such as the placement of an ignition composition onto a gas generant material having a selected form or to a non-gas generant surface within an inflator device, for example.

SUMMARY OF THE INVENTION

A general object of the invention is to provide improved igniter compositions, inflator devices and methods for including an igniter material within an inflator device.

A more specific objective of the invention is to overcome one or more of the problems described above.

The general object of the invention can be attained, at least in part, through an improvement in igniter compositions used to ignite a gas generant material within an inflator device. As detailed below, such improvement in accordance with one embodiment of the invention involves including, in the igniter composition, a silicone resin additive effective to adhere the igniter composition to a surface within the inflator device.

The prior art generally fails to provide inflator device assemblies and igniter compositions useable therein which can operate as effectively as may be desired without including or requiring additional hardware such as igniter tubes, igniter cup assemblies or the like to hold or contain such igniter materials. At least partially as a result thereof, the prior art has generally failed to provide inflator device assemblies having a design of one or more of desired simplicity of construction and/or operation, reduced weight and reduced cost.

The invention further comprehends an improvement in an airbag inflator device which contains a quantity of gas generant material reactable to produce gas for inflation of an associated inflatable device and a quantity of an igniter material reactable to ignite at least a portion of the quantity of gas generant material. In accordance with one preferred embodiment of the invention, such improvement relates to the inclusion within the inflator device of a damper pad onto which pad at least a portion of the quantity of igniter material forms a coating.

The invention still further comprehends a method of including an igniter material within an inflator device. Such method, in accordance with one preferred embodiment of the invention, involves applying an igniter material composition which includes an igniter fuel, an igniter oxidizer and a silicone resin additive effective to adhere the igniter material composition to an inner surface of the inflator device.

The invention yet still further comprehends a method of providing an igniter material for inclusion within an inflator device which contains at least one damper pad. In particular, such method includes coating a damper pad substrate with an igniter material composition which includes an igniter fuel, an igniter oxidizer and an additive effective to adhere the igniter material composition to the damper pad substrate.

Other objects and advantages will be apparent to those skilled in the art from the following detailed description taken in conjunction with the appended claims and drawings.

DETAILED DESCRIPTION OF THE INVENTION

Figure 1:
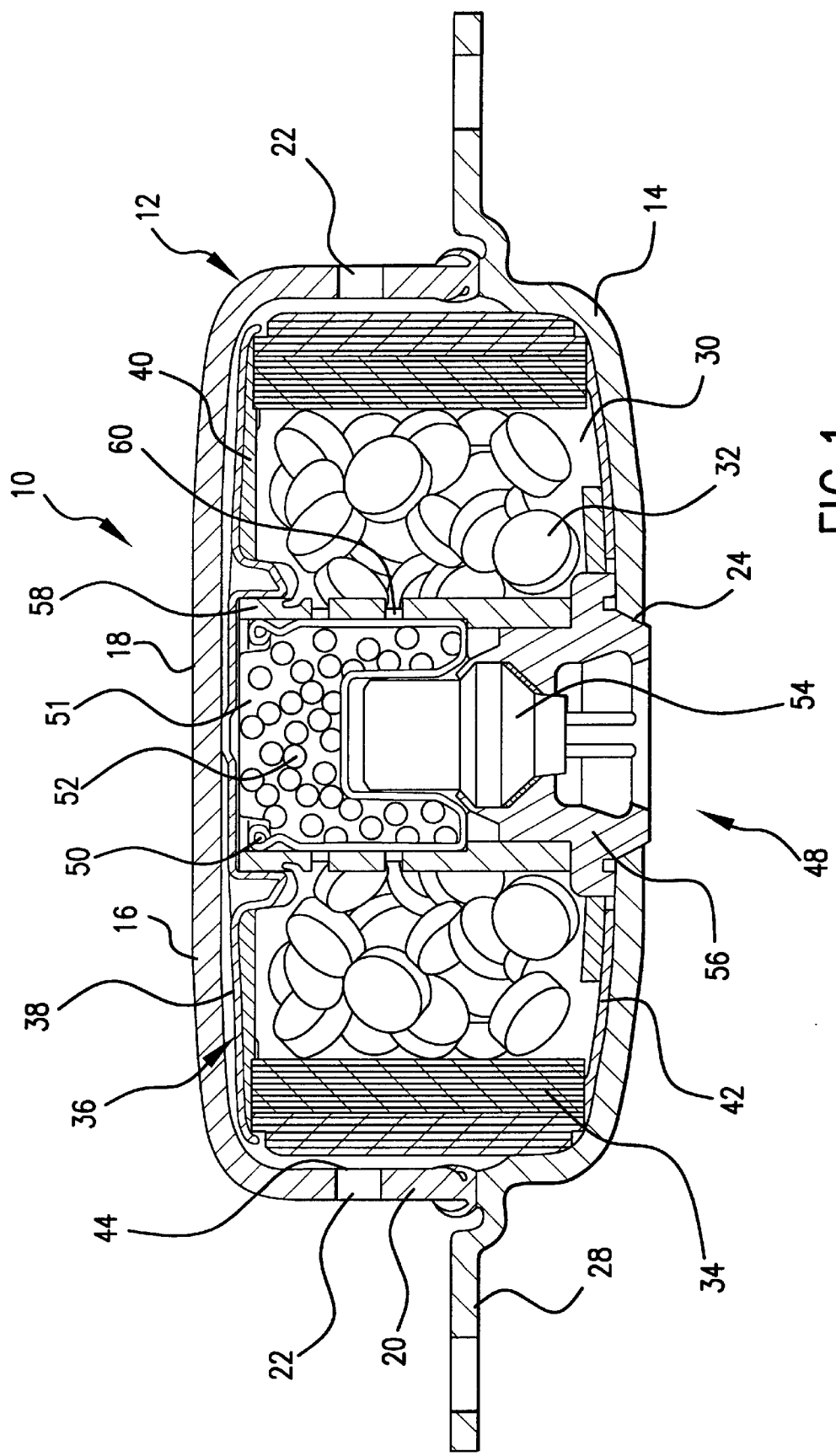
FIG. 1 is a simplified cross sectional view of a single stage inflator device as is known in the prior art.

The present invention provides improved igniter compositions, inflator devices and methods for including an igniter material within an inflator device such as suitable for use in the inflation of an inflatable device such as a vehicle occupant restraint airbag cushion. The invention contemplates such igniter compositions which include a silicone resin additive effective to adhere the igniter composition to a surface within the inflator device.

As will be described in greater detail below and in accordance with certain preferred embodiment of the invention, subject igniter compositions can desirably be applied such in the form of a coating onto the surface of the gas generant material. In at least certain other preferred embodiments of the invention, however, subject igniter compositions can desirably be applied to one or more non-gas generant surfaces within the inflator device, including, for example, damper pads, igniter cords and the like.

In accordance with a preferred practice of the invention, preferred silicone resin additives for use in the practice of the invention desirably function as a binder. That is, preferred silicone resin additives for use in the practice of the invention can desirably serve to bind together other components of the igniter composition. For example, preferred silicone resin additives can desirably serve to bind together two or more of an igniter fuel material, an igniter oxidizer material or performance additive material such as in the form of a metal oxide such as may be included to improve either or both slag formation or burn rate properties or qualitites.

Preferred silicone resin additives for use in the practice of the invention are typically composed of a plurality of polysiloxane chains, such as of various molecular weights. For example, useful silicone resin additives include those composed of polysiloxane chains which have molecular weights in the range of 8000 to 80,000 grams per mole. As will be appreciated, useful silicone resins may contain or include various chemical groups such as methyl ($CH_3$), phenyl ($C_6H_6$) and propyl ($CH_2CH_2CH_3$), for example, bound to such polysiloxane backbone. Such resins are commonly identified as hydroxyl functional meaning that they include or contain a hydroxyl content (such as in the form of a silanol group) that desirably can undergo a condensation reaction such as to effect further or additional chain elongation and/or crosslinking. In practice, the use of such silicone resin additives having hydroxyl contents in the range of about 1% to about 10% by weight of resin material has been found useful in resulting in formulations which can conveniently provide or result in desired surface coverage upon the application of corresponding formulations. Further, while useful silicone resin additives may include or contain various contents of silicon bound to oxygen, in practice it is generally preferred that between about 60% and 75% of the silicon bonds contained in the resin additive be with or to oxygen atoms.

Specific silicone resin additives which may be used in the practice of the invention include: Dow Corning 6-2230 silicone resin of the Dow Corning Corporation; Wacker SilRes REN 100 silicone resin of Wacker Silicones Corporation of Wacker-Chemie GmbH; and General Electric SR355 silicone resin of GE Silicones of General Electric Company, for example.

As identified above, preferred silicone resin additives for use in the practice of the invention also desirably function as an adhesive effective to adhere the balance of an igniter composition to a surface within the inflator device. In one preferred embodiment of the invention, the desired silicone resin additive is added to a suspension of igniter components in a suitable organic solvent, such as a solvent selected from the group of solvents consisting of alcohols, ketones, esters, aromatics and chlorinated organics. Ethanol and acetone are examples of quick drying organic solvents which, in accordance with certain preferred embodiments of the invention, are suitable for use in the practice of the invention.

The resin additive dissolves in the organic solvent and, in combination with the igniter components, a suspension is formed. The suspension can then be applied, desirably in the form of a coating of relative uniform thickness, onto a surface (sometimes referred herein as a "target surface") such as may occur or be present within a particular inflator device. As the organic solvent evaporates, the resin additive becomes tacky and serves to bind or adhere the balance of the igniter composition to the target surface. Upon completion of the drying process, a strong bond or otherwise effective joining or adhesion is formed between the igniter composition and the target surface. The preferred practice of the invention results in the desired adhesion or joining of the igniter material to the selected target surface without detrimentally impacting the ignitability of igniter material.

Further, in order to provide or result in suitable adherability for the igniter composition to a desired or selected target surface within an inflator device, preferred silicone resin additives for use in the practice of the invention have a solubility of at least one gram per 100 ml of organic solvent. In practice, preferred organic solvents are selected from the group of solvents consisting of alcohols, ketones, esters, aromatics and chlorinated organics.

While the amount of silicone resin additive required for the desired functioning in the practice of the invention can vary dependent on factors such as the specific composition of the particular igniter material, it has been found generally desirable to include the selected silicone resin additive in such an igniter composition in a relative amount of at least about 1 wt. % to no more than about 10 wt. %, based on the total composition weight of the igniter material (e.g., fuel, oxidizer and any other additives) and the silicone resin additive.

While the broader practice of the invention is not limited to the inclusion and use of silicone resin additives to specific igniter compositions, the inclusion and use of silicone resin additives in accordance with the invention has been found particularly useful or practical with certain igniter compositions or certain igniter composition component materials.

In view thereof, particularly preferred igniter compositions for use in the practice of the invention include, as a primary fuel component an alloy of aluminum and magnesium (herein sometimes referred to as an "Al/Mg alloy"). It has been found that increasing the magnesium content of such fuel component generally results in the formulation having increased ignitability as well as increased sensitivity to impact, friction and electrostatic discharge. In view of the increased sensitivity of higher magnesium content formulations, an Al/Mg alloy which contains about 50 to about 90 wt. % Al and about 10 to about 50 wt. % Mg, preferably about 50 to about 80 wt. % Al and about 20 to about 50 wt. % Mg and, at least in certain preferred embodiments, more preferably an Al content of about 70 percent and a Mg content of about 30 percent, will generally be preferred. In accordance with certain preferred embodiments of the invention, between about 10 to about 60 weight percent of the silicone resin additive-containing igniter composition generally constitutes such an Al/Mg alloy fuel component.

Further, preferred igniter compositions for use in the practice of the invention include an oxidizer component such as composed of strontium nitrate, an alkali metal nitrate (such as potassium nitrate, for example) or a combination thereof. It has been found generally desirable that the major oxidizer component be selected to assist in producing an easily filterable combustion product slag. In accordance with one preferred embodiment of the invention, at least about 50 wt. % up to 100 wt. % of the oxidizer component of the subject igniter composition comprises strontium nitrate. Strontium nitrate has been found to desirably produce condensible combustion products, such as strontium oxide, which have a relatively high-melting point. As will be appreciated, such high-melting temperature condensible combustion products can generally more easily be filtered or otherwise removed from the inflation gases produced or formed by an associated inflator device, as compared to igniter compositions, such as standard boron potassium nitrate, which produce or form low-melting temperature combustion products in relatively greater proportion.

Thus, an igniter composition in accordance with one preferred embodiment of the invention includes:
  at least about 10 wt. % and no more than about 60 wt. % of an Al/Mg alloy igniter fuel;
  at least about 30 wt. % and no more than about 80 wt. % of an igniter oxidizer selected from the group consisting of strontium nitrate, alkali metal nitrates and combinations thereof; and
  at least about 1 wt. % and no more than about 10 wt. % of a silicone resin additive effective to adhere the igniter composition to a surface within the inflator device, as described above.

As identified above, subject igniter compositions can desirably be applied such in the form of a coating onto the surface of the gas generant material. In at least certain other preferred embodiments of the invention, however, subject igniter compositions can desirably be applied to one or more non-gas generant surface within the inflator device, including, for example, damper pads, igniter cords and the like. Further, as will be appreciated, preferred target surfaces for use in the practice of invention are surfaces which already exist or are present within an inflator assembly. Through such use of an existing surface, igniter compositions in accordance with the invention can be included with desired inflator assemblies without requiring added elements to the assembly. Consequently and as further described below, the inflator assembly inclusion and use of such igniter compositions can desirably simplify the construction of the associated inflator assembly. Though such simplification, one or more of the cost, weight, size and/or performance dependability of the resulting inflator assembly can be favorably altered.

Practice and application of the invention, as well as at least some of the advantages associated or connected therewith, will be discussed in connection with FIGS. 3–8.

Figure 3:
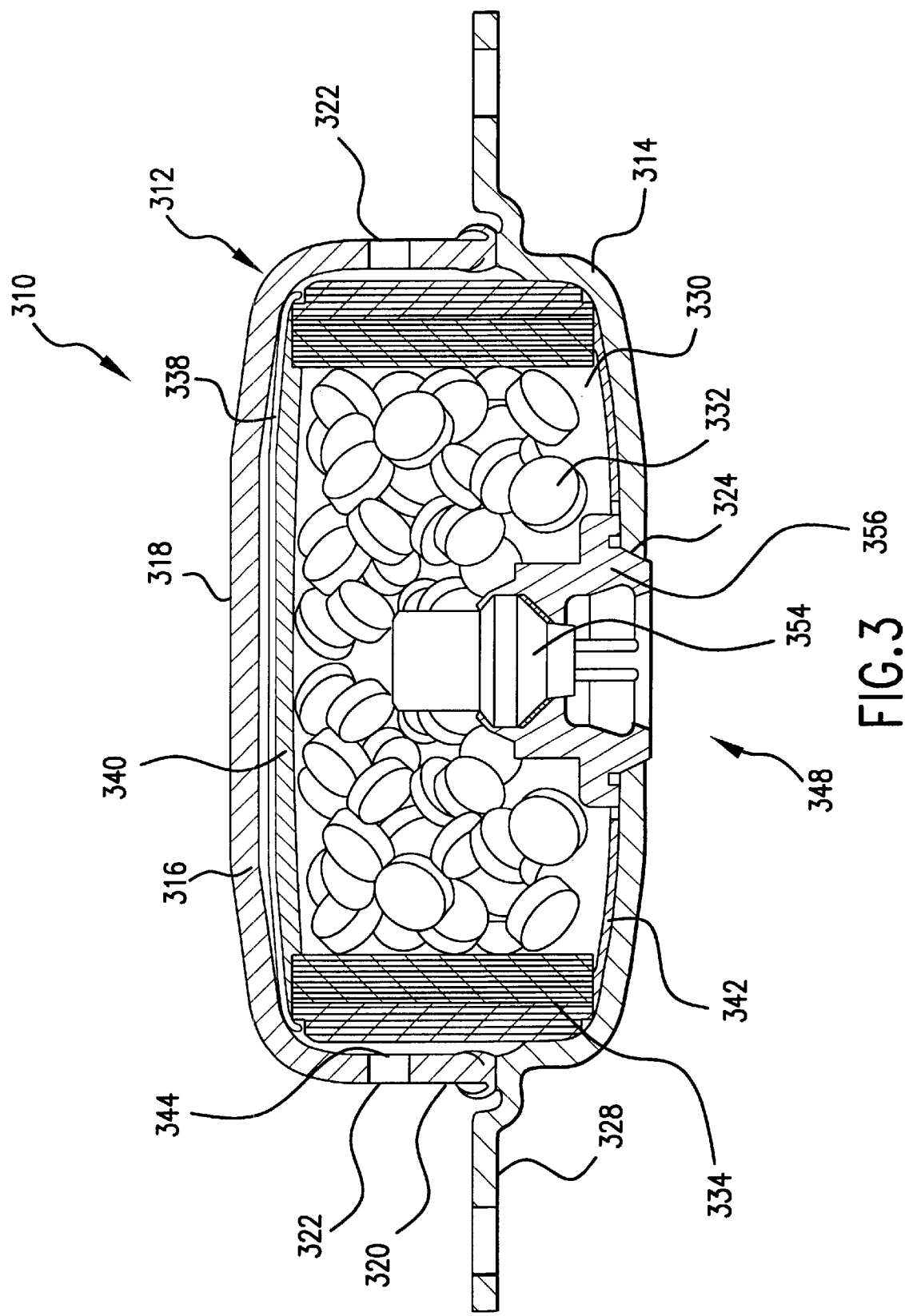
FIG. 3 is a simplified cross sectional view of a single stage inflator device in accordance with one embodiment of the invention.

FIG. 3 shows a simplified view of a single stage inflator device or assembly 310, in accordance with one embodiment of the invention. While the inflator assembly 310 is many respects similar to the inflator 10 described above, the inflator assembly 310 is significantly simplified in either or both construction and operation. In particular, the inflator assembly 310 avoids the need for an igniter cup (to hold or contain an igniter material), an igniter tube (wherethrough products of ignition can be passed through and directed into contact with an associated supply of gas generant material to effect ignition and reaction thereof) or a retainer (to hold or retain either of both such an igniter cup and igniter tube in a particular relative arrangement within an inflator assembly).

The inflator assembly 310, similar to the inflator 10, has a generally cylindrical external outline and includes a housing construction 312 such as formed of two structural components, i.e., a lower shell or base portion 314 and an upper shell or diffuser cap portion 316, such as may desirably be made of steel and appropriately joined or fastened together such as by application of an inertia welding operation. The housing 312 is illustrated in the general form of a flattened, disk-shaped circular cylinder having a length to diameter ratio of about 0.5 or less such as may most conveniently correspond to the shape of the vehicle steering wheel.

The diffuser cap portion 316 is in the general form of an inverted bowl and includes a top wall 318 and a cylindrical sidewall 320. The sidewall 320 includes a plurality of spaced, preferably, generally uniformly spaced gas exit ports 322. The base portion 314 includes a mounting opening 324 and a peripheral bracket 328 that extends radially outward from the housing 312 and serves to form an interface attachment which is used to attach the inflator assembly 310 to a vehicle, such as identified above.

The housing 312, similar to the housing 12, is configured to define a generally cylindrical chamber, here designated by the reference numeral 330. The chamber 330 contains or houses a supply of a gas generant material 332, such as composed of a pyrotechnic, such as known in the art, in a desired selected form. A filter assembly 334 such as described above surrounds the gas generant material 332.

The inflator assembly 310 includes a retainer 338, a diffuser damper pad 340 and a base damper pad 342 which serve as construction expedients such as to prevent undesired flow passage through the assembly 310 and avoid undesired rattle or contact of the gas generant 332 within the assembly 310. In practice and such as described above, such damper pad elements are commonly composed or fabricated of a glass fiber material or the like. The inflator assembly 310 differs from the inflator assembly 10, however, in that the diffuser damper pad 340 is coated with or otherwise contains or includes an igniter composition in accordance with the invention.

The assembly 310 also includes an adhesive-backed foil seal 344 surrounding the filter 334 and generally adjacent the inner surface of the sidewall 320 such as to preferably hermetically seal the gas generant material 332 within the inflator 310, thereby protecting the gas generant material from possibly damaging ambient conditions, such as including moisture.

The inflator assembly 310 further includes an igniter assembly, generally designated by the reference numeral 348, of reduced complexity, as compared to the igniter assembly 48 in the prior art inflator assembly 10, described above. The igniter assembly 348 may take the form of an igniter device or squib 354 and a squib adapter or holder 356 whereby the igniter squib 354 is mounted to or is mated with the housing 312 in a location within the chamber 330 via the mounting opening 324.

When actuated, the squib 354 causes ignition of the igniter material coated or otherwise contained or included in or on the diffuser damper pad 340. The products formed or resulting from such ignition are, through the designed configuration, in direct contact with the gas generant material 332 contained within the chamber 330 such as to result in the ignition and reaction of the gas generant material 332. The gases produced or formed by such reaction then pass through the filter 334 to rupture the foil seal 344 and pass through the gas exit ports 322 and out from the inflator assembly 310 into an associated airbag cushion (not shown).

As will be appreciated, the inflator assembly 310 eliminates the need for assembly elements such as an igniter cup and/or an igniter tube. Such elimination, in practice, can favorably reduce assembly weight, size and/or performance dependability and thus significantly alter, i.e., reduce, costs such as associated with inflator assembly manufacture, installation and/or operation, for example.

Figure 4:
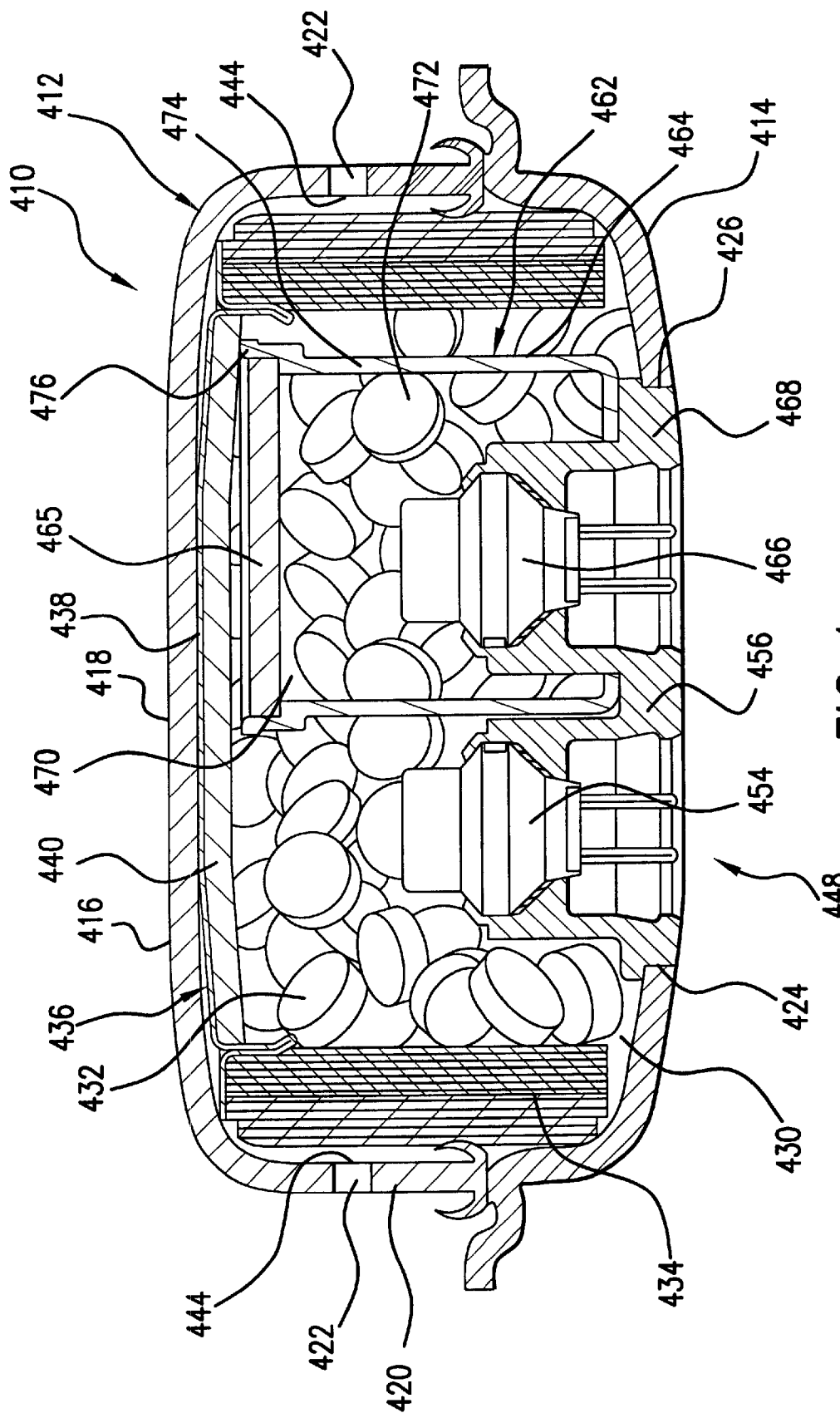
FIG. 4 is a simplified cross sectional view of a dual stage inflator device in accordance with one embodiment of the invention.

FIG. 4 shows a simplified view of a dual stage or adaptive inflator device or assembly 410, in accordance with one embodiment of the invention. While the inflator assembly 410 is in many respects similar to the inflator 210 described above, the inflator assembly 410 is significantly simplified in either or both construction and operation. In particular, the inflator assembly 410 avoids the need for an igniter cup (to hold or contain an igniter material) and an igniter tube (wherethrough products of ignition can be passed through and directed into contact with an associated supply of gas generant material to effect ignition and reaction thereof).

The inflator assembly 410, similar to the inflator assembly 210, includes a housing 412 in the general form of a flattened, disk-shaped circular cylinder having a length to diameter ratio of about 0.5 or less such as may most conveniently correspond to the shape of the vehicle steering wheel. The housing 412 is formed of a lower shell or base portion 414 and an upper shell or diffuser cap portion 416.

The diffuser cap portion 416 includes a top wall 418 and a cylindrical sidewall 420. The sidewall 420 includes a plurality of spaced gas exit ports 422. The base portion 414 includes first and second mounting openings, 424 and 426, respectively.

The housing 412 is configured to define a generally cylindrical first chamber 430 which contains or houses a supply of a first gas generant material 432, such as described above. A filter assembly 434 such as described above surrounds the first gas generant material 432.

Figure 2:
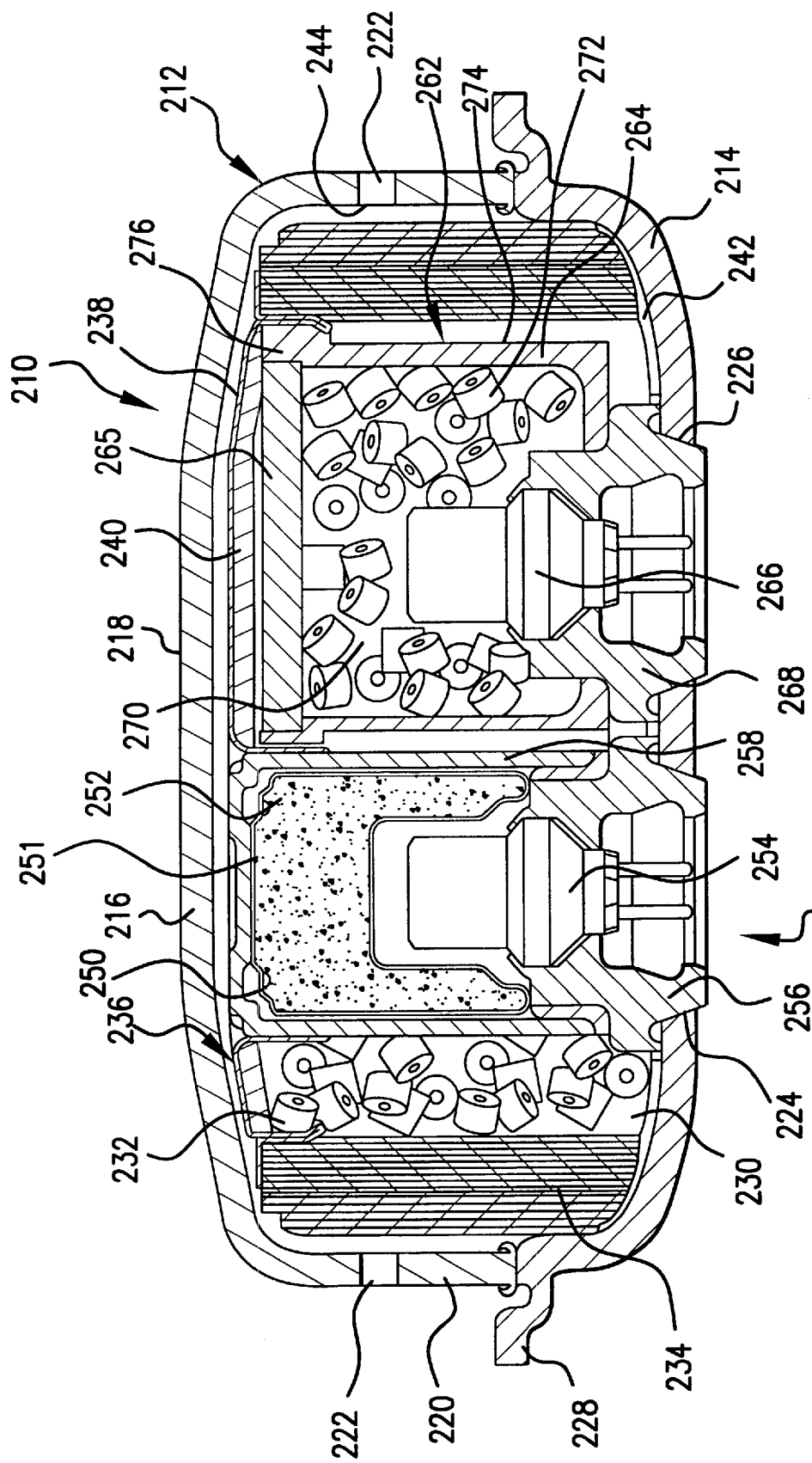
FIG. 2 is a simplified cross sectional view of a dual stage inflator device as is known in the prior art.

Further similar to the inflator assembly 210, the inflator assembly 410 also includes a retainer assembly 436 such as composed of a retainer 438 and a diffuser damper pad 440. The inflator assembly 410 also may, if desired, include a base damper pad (not shown) similar to the base damper pad 242, shown in FIG. 2. The diffuser damper pad 440, however, is coated or otherwise contains or includes, in accordance with the invention, with an igniter composition.

The assembly 410 also includes an adhesive-backed foil seal 444 surrounding the filter 434 and generally adjacent the inner surface of the sidewall 420 such as to preferably hermetically seal the gas generant material 432 within the inflator 410, thereby protecting the gas generant material from possibly damaging ambient conditions, such as including moisture.

The inflator assembly 410 further includes a first igniter assembly, generally designated by the reference numeral 448, of reduced complexity, as compared to the igniter assembly 248 in the prior art inflator assembly 210, described above. The igniter assembly 448 may take the form of an igniter device or squib 454 and a squib adapter or holder 456 whereby the igniter squib 454 is mounted to or is mated with the housing 412 in a location within the chamber 430 via the first mounting opening 424.

The first chamber 430 also houses or contains a second chamber 462 which similar to the chamber 262 in the inflator assembly 210 described above includes a gas generant cup 464, a lid closure 465, a second igniter device or squib 466, and a second squib adapter 468 whereby the second chamber 462 is mounted to or mates with the housing 412 at the second mounting opening 426.

Similar to the inflator assembly 210, the generant cup 464 and the lid closure 465 cooperate to form a generant cup interior 470 wherein is desirably placed a selected quantity of a second gas generant material 472. In particular, the generant cup 464 desirably includes a generally cylindrical sidewall 474 which includes a shoulder portion 476 formed therein and with which the lid closure 465 forms a press or interference fit form of attachment when in a static state or condition.

When actuated, the squib 454 causes ignition of the igniter material coated or otherwise contained or included in or on the diffuser damper pad 440. The products formed or resulting from such ignition are, through the designed configuration, in direct contact with the gas generant material 432 contained within the chamber 430 such as to result in the ignition and reaction of the gas generant material 432. The gases produced or formed by such reaction then pass through the filter 434 to rupture the foil seal 444 and pass through the gas exit ports 422 and out from the inflator assembly 410 into an associated airbag cushion (not shown).

As with the inflator assembly 310, the inflator assembly 410 in accordance with the invention eliminates the need for assembly elements such as an igniter cup and/or an igniter tube. Such elimination, in practice, can favorably reduce assembly weight, size and/or performance dependability and thus significantly alter, i.e., reduce, costs such as associated with inflator assembly manufacture, installation and/or operation, for example.

While the invention has been described above with respect to inflator assemblies wherein the ignition material of the invention is coated or otherwise applied on or in a damper pad contained within the inflator structure, it will be appreciated that the broader practice of the invention is not necessarily so limited. For example, in FIGS. 5 and 6, single and dual stage inflator assemblies, 510 and 610, respectively, similar to those described above are shown to identify various possible surfaces therewithin that can be appropriately coated or otherwise have applied thereto ignition material compositions in accordance with the invention.

Figure 5:
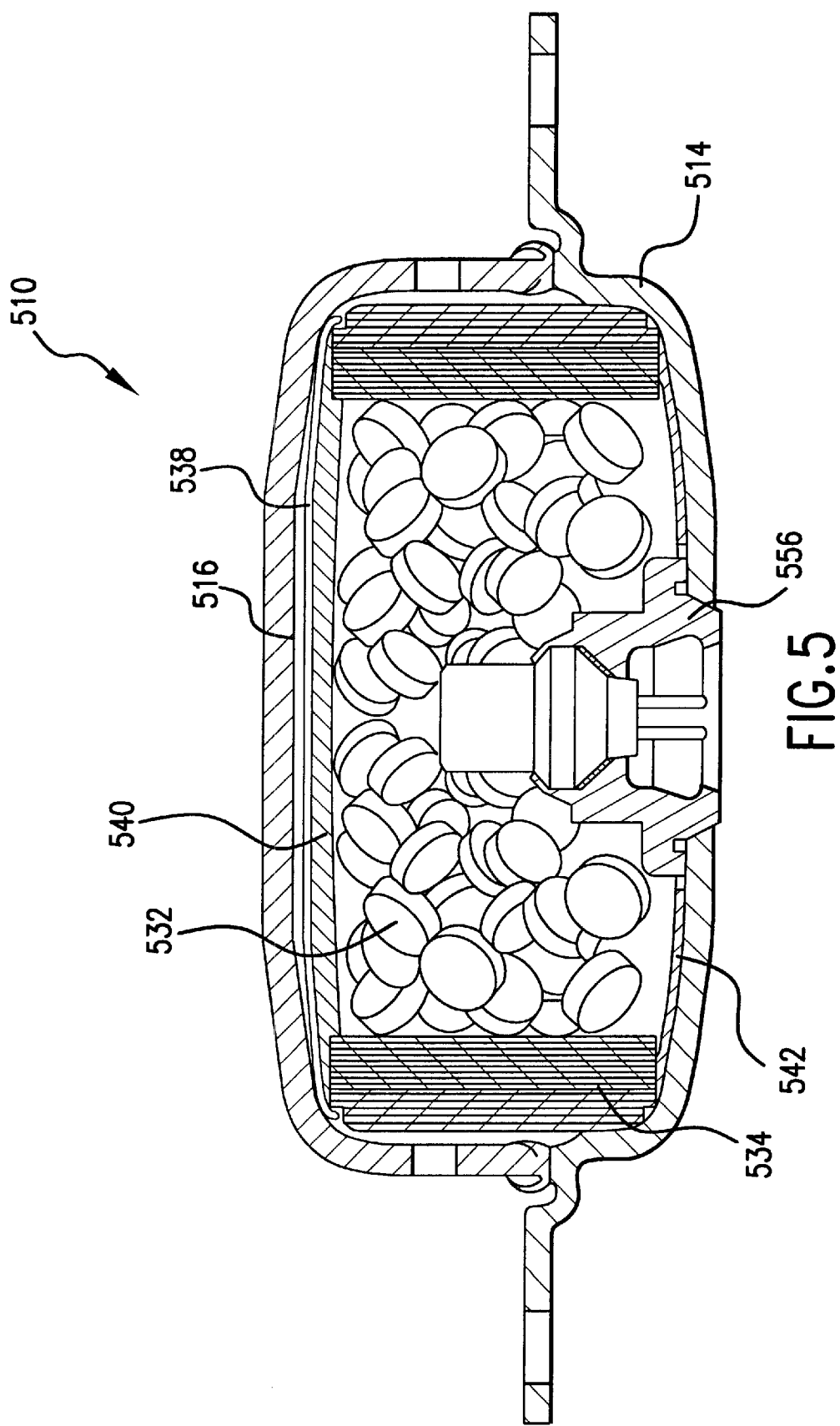
FIG. 5 is a simplified cross sectional view of a single stage inflator device, similar to the inflator device shown in FIG. 3 but now showing or identifying alternative surface locations to which a coating of an igniter composition in accordance with the invention can be applied.

Turning to FIG. 5, in the single stage inflator assembly 510, potential or candidate surfaces therewithin to which ignition material compositions in accordance with the invention can be applied may include, for example and without unnecessary limitation, one or more of the following surfaces: the inner surface of the lower shell or base portion 514, the inner surface of the upper shell or diffuser cap portion 516, the gas generant 532, the filter assembly 534; the retainer 538, the diffuser damper pad 540 (such as similar to as shown in FIG. 3), the base damper pad 542, the squib adapter or holder 556.

Figure 6:
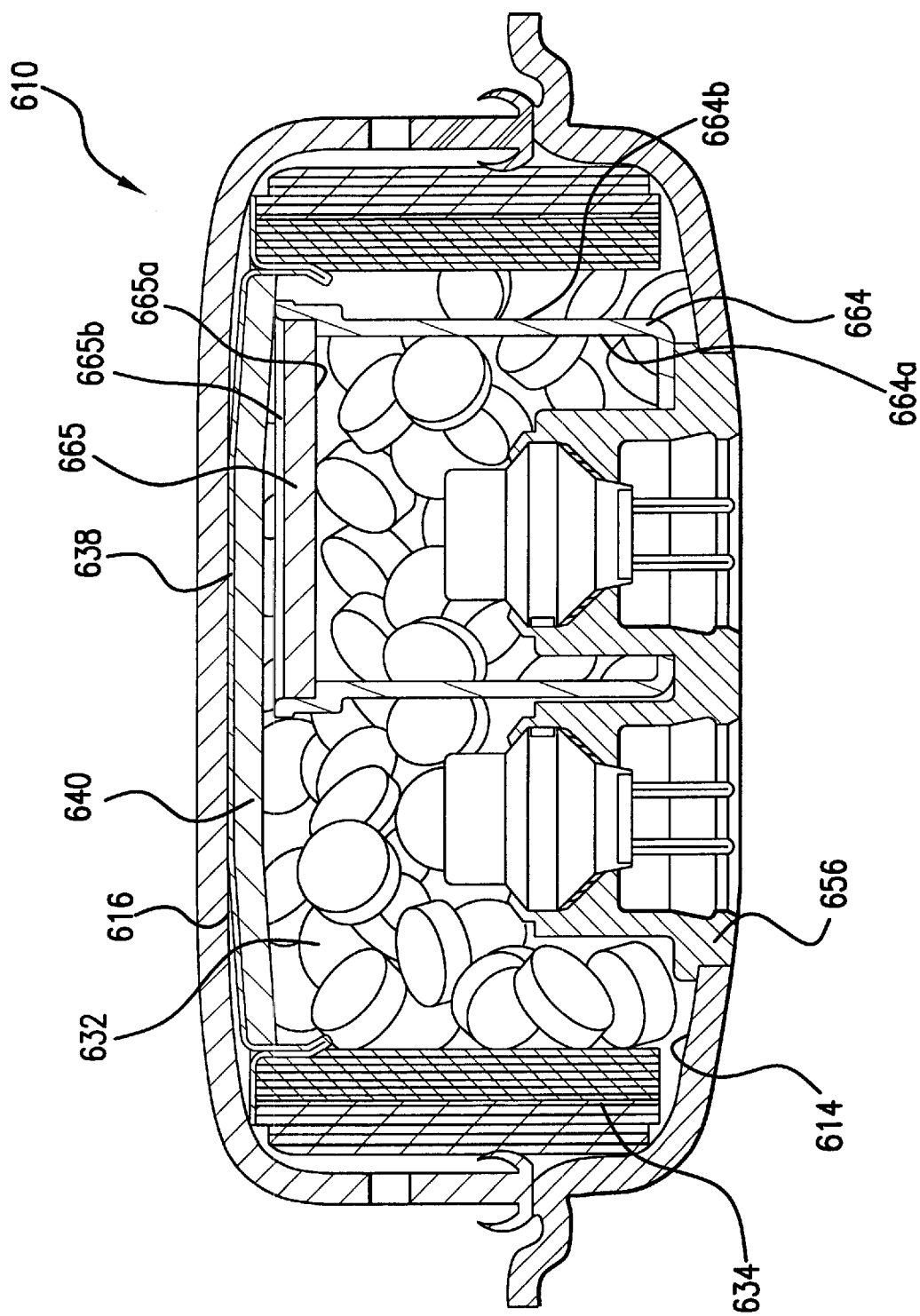
FIG. 6 is a simplified cross sectional view of a dual stage inflator device, similar to the inflator device shown in FIG. 4 but now showing or identifying alternative surface locations to which a coating of an igniter composition in accordance with the invention can be applied.

FIG. 6 shows that potential or candidate surfaces in the dual stage inflator assembly 610 to which ignition material compositions in accordance with the invention can be applied include: may include without unnecessary limitation one or more of the following surfaces: the inner surface of the lower shell or base portion 614, the inner surface of the upper shell or diffuser cap portion 616, the gas generant 632, the filter assembly 634; the retainer 638, the diffuser damper pad 640 (such as similar to as shown in FIG. 4), the squib adapter or holder 656, the inner surface 664a of the generant cup 664, the outer surface 664b of the generant cup 664, the inner surface 665a of the lid closure 665 and the outer surface 665b of the lid closure 665, for example.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1 and Comparative Examples 1 and 2

In each of these tests, 100 grams of igniter composition solids, as shown in TABLE 1, below, was mixed in 100 ml of a selected solvent, as also shown in TABLE 1, to form a solvent-igniter suspension. (Note: The Al/Mg alloy had an Al content of 70 weight percent and a Mg content of 30 weight percent.)

TABLE 1

| TEST | IGNITER COMPOSITION (wt. %) | | | SOLVENT |
|---|---|---|---|---|
| | $SrNO_3$ | Al/Mg Alloy | Silicone Resin | |
| Example 1 | 67.21 | 30.79 | 2.00 | ethanol |
| Comp. Ex. 1 | 68.58 | 32.42 | — | ethanol |
| Comp. Ex. 2 | 68.58 | 32.42 | — | 10% water/ 90% ethanol |

The solvent-igniter suspensions of Example 1 and Comparative Examples 1 and 2 were then respectively spray applied at high pressure onto the surface of gas generant tablets of a gas generant formulation composed of 50.38 wt. % guanidine nitrate, 46.62 wt. % basic copper nitrate, 2.70 wt. % aluminum oxide, and 0.30 wt. % silicon dioxide. The gas generant tablets were of the following dimensions:

diameter=0.25 in thickness=0.080 in

In each case, 2.0% by weight of each igniter composition was sprayed onto the tablet surfaces. After spraying the coated tablets were dried under a stream of hot air.

Example 2 and Comparative Examples 3 and 4

In these tests, the adherence and retention of the coating of the igniter compositions onto gas generant tablets prepared in Example 1 and Comparative Examples 1 and 2, respectively, was measured and evaluated. In Example 2, the igniter coated gas generant tablets of Example 1 were tested. In Comparative Examples 3 and 4, the igniter coated gas generant tablets of Comparative Examples 1 and 2, respectively, were tested.

In each test, 50 grams of the respective igniter-coated gas generant tablets were placed on a 25-mesh screen and vibrated at high speed in a sieve shaker for 5 minutes. While the severity of such vibration was extreme, as compared to conditions which might normally be anticipated for typical vehicular gas generant-containing inflator installations, such testing was adequate to show relative differences among the samples.

Following such vibration treatment, the samples are weighed to determine the amount of weight loss. The weight loss was all attributed to loss of igniter material from the surface of the gas generant tablets and the percent of igniter material remaining on the surface was calculated. TABLE 2, below, reports for each of the tests, the percentage of igniter material remaining on the respective gas generant tablets following being subjected to such vibration treatment.

TABLE 2

| TEST | PERCENTAGE OF IGNITER MATERIAL REMAINING AFTER VIBRATION |
|---|---|
| Example 2 | 22.08 |
| Comp. Ex. 3 | 2.00 |
| Comp. Ex. 4 | 6.87 |

Discussion of Results

As the data in TABLE 2 shows, coating the gas generant tablets with the silicone resin-containing igniter composition in accordance with the invention, resulted or provided the best (i.e., greatest) retention of igniter material after subject to the vibration treatment. It is also noted that while the water containing solvent mixture used in Comparative Example 4 resulted in improved retention of igniter composition on the gas generant after vibration as compared to that resulting Comparative Example 3, the extent of igniter material retention was still significantly less than that obtained or provided through the practice of the invention.

Example 3 and Comparative Example 5

In these tests, the performance of the igniter-coated gas generant tablets of Example 1 and Comparative Example 1 were evaluated. In each of these tests, 32 grams of the respective igniter-coated gas generant tablets was loaded in an inflator simulator. The inflator simulator was provided with a pressure transducer to measure the pressure within the combustion chamber thereof. The combustion chamber pressure vs. time performance was recorded by means of a data collection system. Such pressure vs. time performance realized with the test inflator device, containing the igniter-coated gas generant tablets of Example 1 and Comparative Example 1, respectively, is shown in FIG. 7.

Discussion of Results

Figure 7:
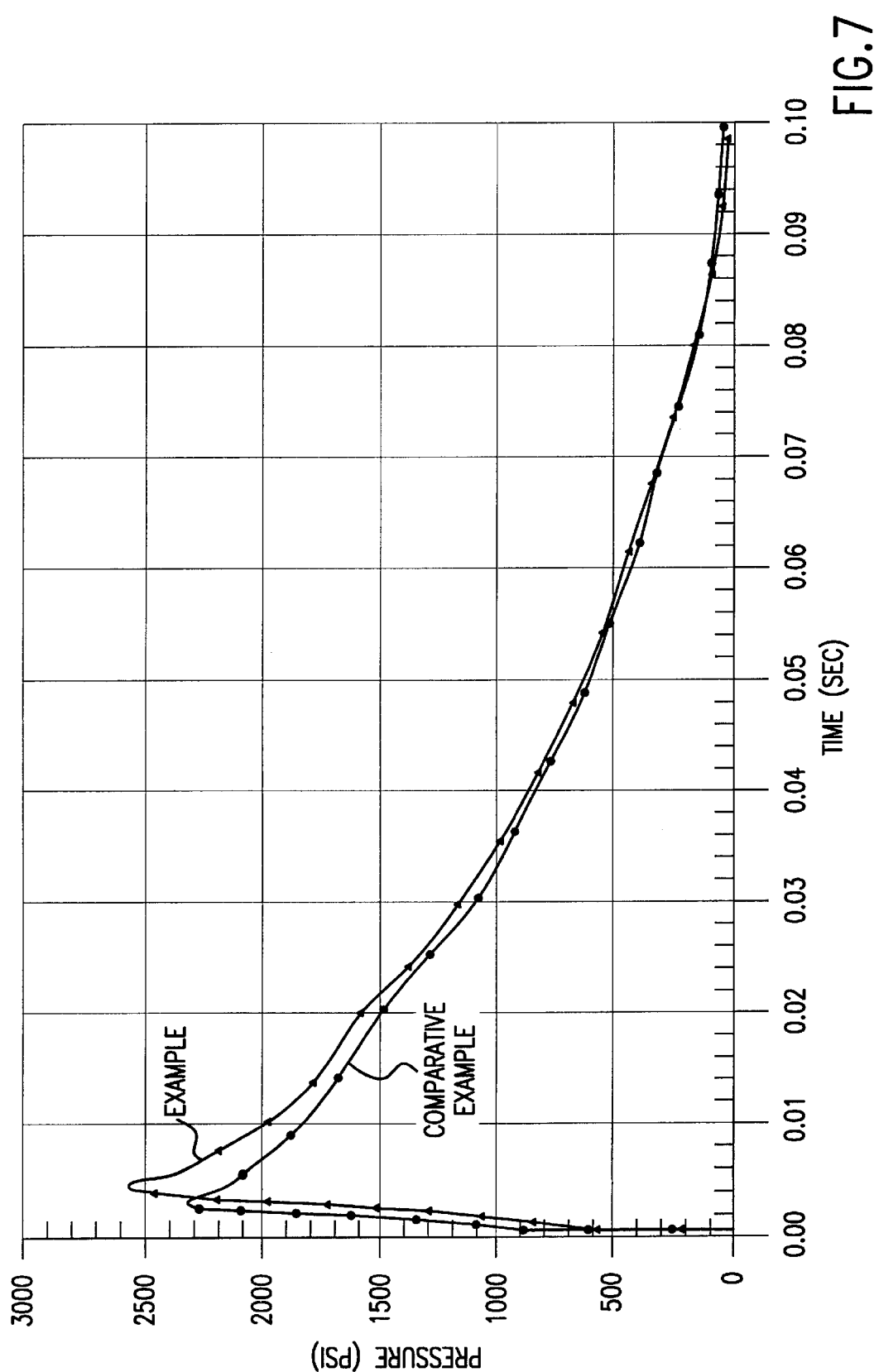
FIG. 7 is a graphical depiction of combustion chamber pressure as a function of time performance realized with the test inflator in Example 3 and Comparative Example 5.

As shown by FIG. 7, the performance of the igniter-coated gas generant tablets in Example 3 and Comparative Example 5 were very similar in terms of time to first pressure and rise rate. Thus, the data presented shows that equivalent performance and improved adherence are realized by incorporation of silicone resin binder in the igniter formulation, in accordance with the invention.

Example 4

In this example, a test inflator device similar in construction to the dual stage or adaptive inflator device or assembly 410 shown in FIG. 4 was used. The test inflator device contained 43 grams of a suitable gas generant material and the damper pad of the test device was spray coated with 1.5 grams of a silicone resin additive-containing igniter composition, in accordance with the invention. In particular, the igniter material used was of the following composition:

30.79 wt. % Al/Mg alloy igniter fuel in the form of a solid solution having an Al content of 70 weight percent and a Mg content of 30 weight percent;

67.21 wt. % strontium nitrate igniter oxidizer; and 2.0 wt. % silicone resin additive.

The test inflator device was mated to a 60-liter steel tank equipped with a pressure transducer, and the tank pressure vs. time performance obtained therewith recorded by means of the pressure transducer and associated data collection system. For purposes of this Example, the test inflator device was operated in a manner wherein only the first igniter assembly 448, and not the second igniter device or squib 466, was actuated and fired.

Figure 8:
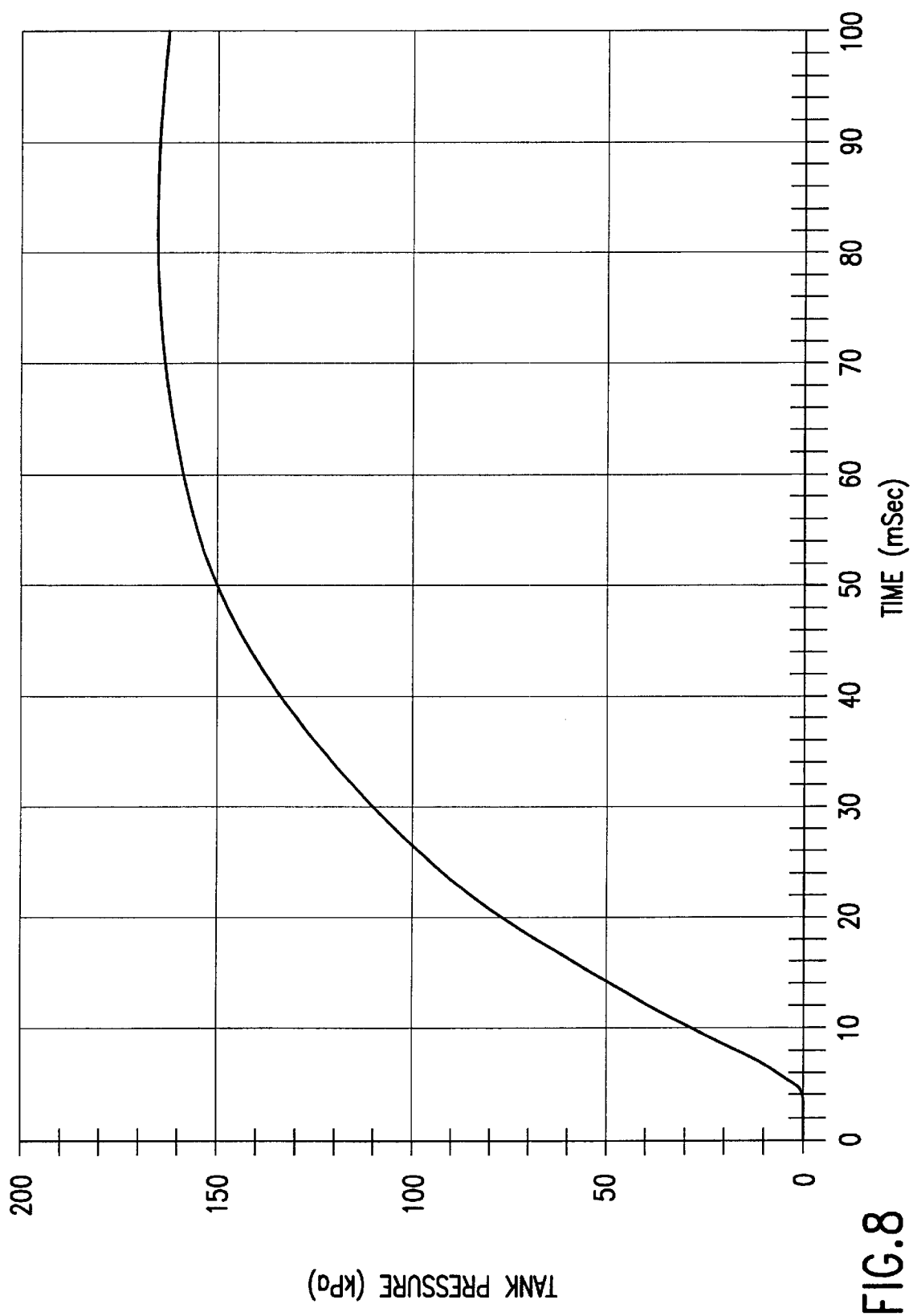
FIG. 8 is a graphical depiction of tank pressure as a function of time performance realized with the test inflator in Example 4.

The tank pressure vs. time performance realized with the test inflator device is illustrated in FIG. 8.

Discussion of Results

As shown by FIG. 8, the test inflator with the simplified design and construction in accordance with the invention, provided tank pressure vs. time performance consistent with desired inflator operation. Thus, through practice of the invention, inflators of desirably simplified design and construction can be used to provide desired operation and performance.

In view of the above, the invention provides inflator device assemblies and igniter compositions useable therein such that avoid the need for inclusion of hardware such as igniter tubes, igniter cup assemblies or the like to hold or contain the igniter materials of the inflator device. At least partially as a result thereof, the invention provides inflator device assemblies having a design, construction or operation of increased simplicity, reduced weight and/or reduced cost.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an airbag inflator device containing a quantity of gas generant material reactable to produce gas for inflation of an associated inflatable device, the inflator device also containing a quantity of an igniter material reactable to ignite at least a portion of the quantity of gas generant material, the improvement comprising:
   a damper pad within the inflator device and onto which damper pad at least a portion of the quantity of igniter material forms a coating.

2. The improvement of claim 1 wherein at least a portion of the damper pad onto which the igniter composition forms a coating comprises a glass fiber-based surface.

3. The improvement of claim 1 wherein the igniter material includes a silicone resin additive effective to adhere the igniter material to the damper pad.

4. The improvement of claim 3 wherein the silicone resin additive has a hydroxyl content in the range of about 1% to about 10% by weight and a solubility of at least one gram per 100 ml of organic solvent.

5. The improvement of claim 4 wherein the igniter material comprises:
   at least about 10 wt. % and no more than about 60 wt. % of an Al/Mg alloy igniter fuel;
   at least about 30 wt. % and no more than about 80 wt. % of an igniter oxidizer; and
   at least about 1 wt. % and no more than about 10 wt. % of the silicone resin additive.

6. The improvement of claim 4 wherein the silicone resin additive has a solubility of at least one gram per 100 ml of organic solvent selected from the group of solvents consisting of alcohols, ketones, esters, aromatics and chlorinated organics.

7. The improvement of claim 1 wherein the igniter material includes a fuel component comprising an Al/Mg alloy.

8. The improvement of claim 7 wherein the Al/Mg alloy contains about 50 to about 90 wt. % Al and about 10 to about 50 wt. % Mg.

9. The improvement of claim 7 wherein the Al/Mg alloy fuel component constitutes between about 10 to about 60 weight percent of the igniter material.

10. The improvement of claim 1 wherein the igniter material includes an oxidizer selected from the group consisting of strontium nitrate, alkali metal nitrates and combinations thereof.

11. The improvement of claim 1 wherein the igniter material includes strontium nitrate.

12. The improvement of claim 1 wherein the damper pad onto which the igniter material forms a coating is a diffuser damper pad.

13. The improvement of claim 1 wherein the damper pad onto which the igniter material forms a coating is a base damper pad.

14. The improvement of claim 1 wherein the inflator device includes a base portion and wherein at least a second portion of the quantity of the igniter material forms a coating on an inner surface of the base portion.

15. The improvement of claim 1 wherein the inflator device includes a diffuser cap portion and wherein at least a second portion of the quantity of igniter material forms a coating on an inner surface of the diffuser cap portion.

16. The improvement of claim 1 wherein at least a second portion of the quantity of the igniter material forms a coating on at least a portion of the gas generant material.

17. The improvement of claim 1 wherein the inflator device includes a filter assembly contained therewithin and wherein at least a second portion of the quantity of igniter material forms a coating on the filter assembly.

18. The improvement of claim 1 wherein the inflator device includes a retainer contained therewithin and at least a second portion of the quantity of igniter material forms a coating on the retainer.

19. The improvement of claim 1 wherein the inflator device includes a squib adapter contained therewithin and wherein at least a second portion of the quantity of igniter material forms a coating on the squib adapter.

20. The improvement of claim 1 wherein the inflator device includes a generant cup contained therewithin.

21. The improvement of claim 20 wherein at least a second portion of the quantity of igniter material forms a coating on an inner surface of the generant cup.

22. The improvement of claim 20 wherein at least a second portion of the quantity of igniter material forms a coating on an outer surface of the generant cup.

23. The improvement of claim 1 wherein the inflator device includes a generant cup lid closure contained therewithin.

24. The improvement of claim 23 wherein at least a second portion of the quantity of igniter material forms a coating on an inner surface of the generant cup lid closure.

25. The improvement of claim 23 wherein at least a second portion of the quantity of igniter material forms a coating on an outer surface of the generant cup lid closure.

26. The improvement of claim 1 wherein the inflator device is a single stage inflator assembly.

27. The improvement of claim 1 wherein the inflator device is a dual stage inflator assembly.

28. In an airbag inflator device containing a quantity of gas generant material reactable to produce gas for inflation of an associated inflatable device, the inflator device also containing a quantity of an igniter material reactable to ignite at least a portion of the quantity of gas generant material, the improvement comprising:
   a damper pad within the inflator device and onto which damper pad at least a portion of the quantity of igniter material forms a coating and
   wherein the igniter material includes a silicone resin additive effective to adhere the igniter material to the damper pad, wherein the silicone resin additive has a hydroxyl content in the range of about 1% to about 10% by weight.

29. The improvement of claim 28 wherein the silicone resin additive has a solubility of at least one gram per 100 ml of organic solvent.

30. The improvement of claim 28 wherein the silicone resin additive has a solubility of at least one gram per 100 ml of organic solvent selected from the group consisting of alcohols and ketones.

31. The improvement of claim 28 wherein the igniter material comprises at least about 1 wt. % of the silicone resin additive and no more than about 10 wt. % of the silicone resin additive.

32. The improvement of claim 28 wherein the damper pad is at least in part-glass fiber-based.

33. The improvement of claim 28 wherein the igniter material includes a fuel component comprising an Al/Mg alloy.

34. The improvement of claim 28 wherein the igniter material includes an oxidizer selected from the group consisting of strontium nitrate, alkali metal nitrates and combinations thereof.

35. The improvement of claim 28 wherein the igniter material comprises:

at least about 10 wt. % and no more than about 60 wt. % of an Al/Mg alloy igniter fuel;

at least about 30 wt. % and no more than about 80 wt. % of an igniter oxidizer selected from the group consisting of strontium nitrate, alkali metal nitrates and combinations thereof; and at least about 1 wt. % and no more than about 10 wt. % of the silicone resin additive.

* * * * *